Aug. 30, 1955  C. L. GOULD ET AL  2,716,557
EXTENSIBLE AND FOLDABLE HAND TRUCK
Filed July 13, 1953  2 Sheets-Sheet 1

CHARLES L. GOULD
ELWIN L. CARR
INVENTORS

HUEBNER, BEEHLER,
WORREL & HERZIG
ATTORNEYS

BY Richard M. Worrel

Aug. 30, 1955  C. L. GOULD ET AL  2,716,557
EXTENSIBLE AND FOLDABLE HAND TRUCK
Filed July 13, 1953  2 Sheets-Sheet 2
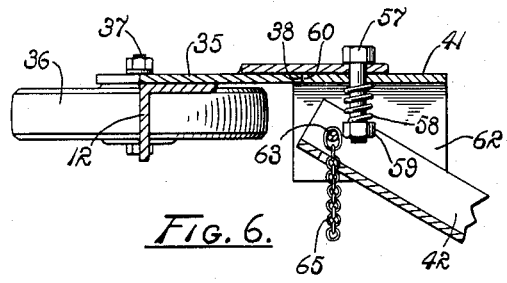
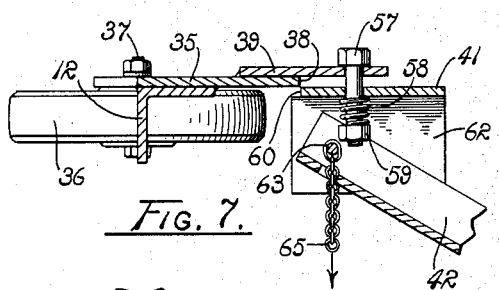
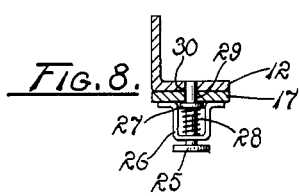
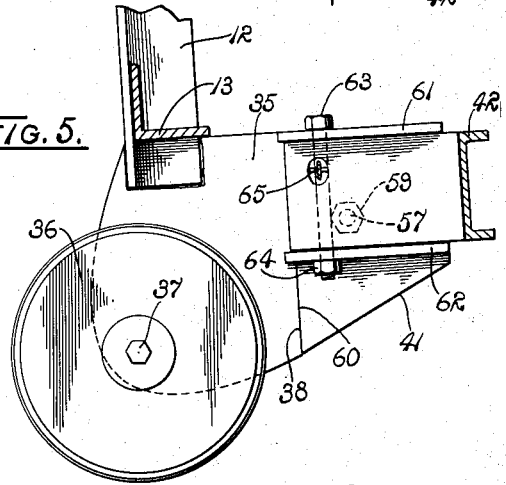
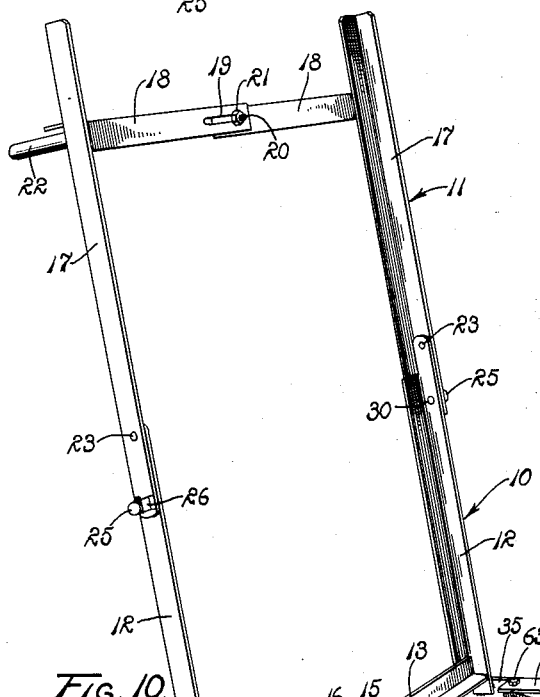
CHARLES L. GOULD
ELWIN L. CARR
INVENTORS
HUEBNER, BEEHLER,
WORREL & HERZIG
ATTORNEYS
BY

2,716,557
EXTENSIBLE AND FOLDABLE HAND TRUCK

Charles L. Gould, Fresno, and Elwin L. Carr, Sanger, Calif.

Application July 13, 1953, Serial No. 367,588

6 Claims. (Cl. 280—34)

This invention relates to hand trucks of the general character ordinarily employed for the purpose of transporting relatively heavy or cumbersome articles of freight, such as boxes or other like containers, either singly or in stacks, in factories, warehouses, wholesale or retail establishments, or in the loading and unloading of freight cars, ships, or delivery trucks.

The ordinary hand truck usually employed for such purposes comprises a rigid upright frame mounted on two small wheels and provided with a lower horizontal lip or blade adapted to be inserted under and to lift a load free of the ground when the truck and said load are manually tipped rearwardly. In the use of such ordinary hand trucks for lifting a relatively large box or a stack of smaller boxes, the box or stack must be slightly tilted forward to permit the truck blade to be inserted beneath the box or stack.

Various types of hand trucks have heretofore been designed for the purpose of eliminating this initial forward tilting of the load by substituting for the horizontal lifting blade a pair of gripper arms having sharp tangs which are operable to grip the sides of a box or the bottom box of a stack thereof. In such trucks, which are sometimes called "grip-trucks," the gripper arms lift and support the entire load without requiring any initial tilting of the box or of the stack of boxes.

The several types of two-wheeled hand trucks of the prior art all require considerable manual effort to tilt the truck backwardly to lift the entire load from the ground before it can be moved to another location and require added manual effort in balancing the loaded truck until it reaches its point of unloading.

It is an object of the present invention to provide an improved hand truck entirely supported on wheels and providing a stable load supporting base or platform and which, in its loaded condition, can be moved to its destination without necessitating manual balancing of the truck and its load but which can be tipped, if convenience so suggests.

Another object is to provide a hand truck having a stable load supporting base or platform entirely supported on a pair of axially aligned rear wheels and a front caster wheel so that the truck may be rotated in a tight circle about a vertical axis located within the confines of said platform.

Another object is to provide a hand truck entirely supported on wheels and having a load supporting base or platform and a rear upright back frame by which the truck may be manually moved to and from its destination.

Another object is to provide a hand truck having a load supporting base or platform which may be extended or contracted to better accommodate boxes or other articles of different sizes.

A further object is to provide a foldable wheel supported hand truck constructed of pivotally connected units associated with cooperating latch means functioning automatically to latch said units in their operable positions when the truck is conditioned for use and capable of being easily and quickly unlatched to permit said units to be folded to form a compact arrangement suitable for storage in a relatively small space.

Another object is to provide a foldable hand truck suitable for supporting and transporting a stack of of boxes or baskets of the general character usually employed in the wholesale delivery of bakery goods or the like, usually referred to as "bread boxes," and which when not in use, may be easily and quickly folded to form a compact unit that occupies a relatively small space in storage or on a delivery vehicle where space is at a premium.

Further objects and advantages will become apparent in the subsequent description in the specification.

In the drawings:

Fig. 5 is an enlarged fragmentary vertical section taken on line 5—5 of Fig. 2.

Fig. 6 is a horizontal section taken approximately on line 6—6 of Fig. 2.

Fig. 7 is a horizontal section similar to Fig. 6 but with a platform lock employed in the hand truck shown in its disengaged position.

Fig. 8 is an enlarged horizontal section taken on line 8—8 of Fig. 3, showing a lock pin of an upright back frame.

Fig. 9 is an enlarged fragmentary front elevation of the forward end of the hand truck.

Fig. 10 is a perspective view of the hand truck as conditioned for use.

Figure 1:
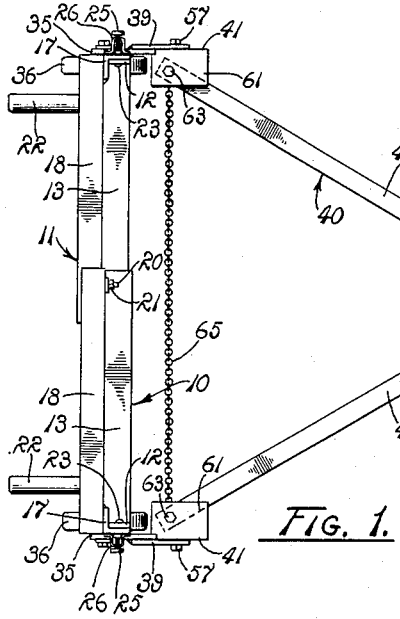
Fig. 1 is a plan view of the hand truck of the present invention.
Figure 2:
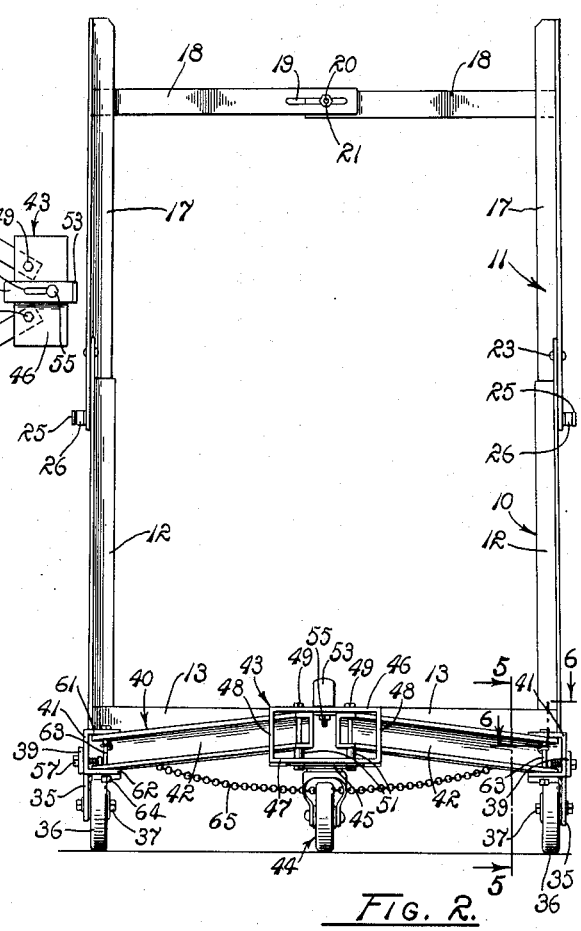
Fig. 2 is a front elevation thereof.
Figure 3:
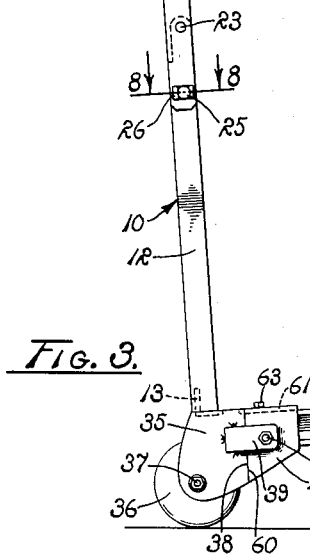
Fig. 3 is a side elevation thereof.

In the preferred embodiment of the hand truck illustrated in the drawings, the device of the present invention, in its condition of use, is seen to provide a rigid wheel supported structure substantially L-shaped as it appears in side elevation in Fig. 3. Essentially the structure comprises a substantially horizontal load supporting wheeled base and an upright back frame extending substantially perpendicularly from the aft portion of said base.

To enable the disclosed hand truck to be folded, the structure is formed of pivotally connected units and to this end the back frame comprises a lower frame section 10 and an upper frame section 11 hingedly connected in a manner subsequently described in greater detail.

These frame sections 10 and 11 are formed of angle iron or other suitable stock and the lower frame section 10 comprises a pair of transversely spaced vertical side rails 12 and a pair of transverse lower spacer bars 13. The lower spacer bars have their outer ends welded or otherwise secured to the lower portions of the respective side rails 12 and their inner ends disposed in slidable overlapping relationship. The inner end portion of one of said spacer bars 13 is provided with a horizontally disposed elongated slot 14 and the inner end portion of the companion spacer bar 13 is provided with a bolt hole disposed to align with said slot. A clamp bolt 15 extends through said slot 14 and the aligned bolt hole and is engaged by a nut 16 to clamp the spacer bars 13 in adjusted position. Inasmuch as the spacer bars are preferably of angle iron and are fitted in overlapping relation a single clamping bolt is all that is required. It will be obvious that channel iron or the like could also be suitably employed. If strap iron is used, a pair of clamping bolts are preferably employed.

Figure 4:
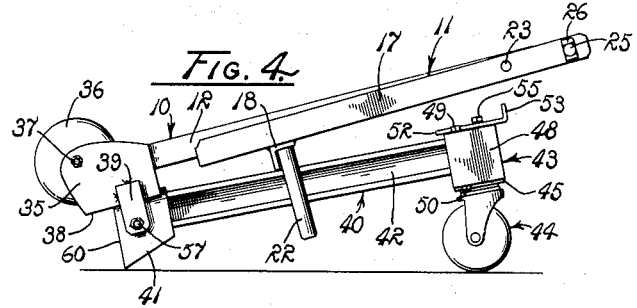
Fig. 4 is a side elevation of the hand truck in collapsed condition.

The upper frame section 11 is constructed somewhat similarly to the lower frame section 12 in that it comprises a pair of transversely spaced vertical side rails 17 and a pair of transverse upper spacer bars 18 having their outer ends welded or otherwise secured to the upper portions of the respective side rails 17 and their inner ends disposed in slidable overlapping relation. One of the spacer bars 18 is provided with a horizontally disposed elongated slot 19 near its inner end and the companion spacer bar 18 carries a clamp bolt 20 projecting through said slot and engaged by a nut 21 to clamp the spacer bars 18 in adjusted position. The comments concerning the spacer bars 13 are similarly applicable to the spacer bars 18. The upper spacer bars 18 are provided with rearwardly projecting hand grips 22 which are of assistance in the manipulation of the truck, and the depending end portions of the side rails 17 of the upper frame section 11 overlap the upper end portions of the side rails 12 of the lower frame section 10 and are hingedly connected thereto by transversely aligned hinge pins or rivets 23. The lower and upper frame sections are thus hingedly connected to enable them to be folded one upon the other, as shown in Fig. 4. Since such folding of the frame sections must be prevented when the hand truck is in condition for use, there is provided releasable latch means associated with the coengaging side rails of both frame sections. Each of such latch means comprises a headed latch pin 25 carried by the lower end portion of the associated side rail 17. As shown in Fig. 8, the latch pin 25 is slidably mounted in a U-shaped housing or strap 26 secured on the outer surface of the side rail 17. Said pin 25 is provided with a stop collar 27 to limit its inward movement and a helical compression spring 28 surrounding the pin between said housing and stop collar urges the pin inwardly to project its inner end through openings 29 and 30 in the respective side rails 17 and 12 which will be in alignment when said side rails are in their extended vertical position of use.

From the above, it will be understood that by reason of the adjustable connections between the lower and upper spacer bars 13 and 18 the width of the entire back frame may be varied and be clamped in adjusted position, and that while the latch pins 25 will normally maintain the lower and upper frame sections 10 and 11 rigidly in vertical alignment said pins may be easily and quickly manipulated to permit a folding of said frame sections.

Welded or otherwise attached to the lower end of each side rail 12 of the lower frame section 10 is a wheel plate 35 and disposed at the inner sides of these plates are a pair of transversely aligned rear directional ground wheels 36 mounted to rotate on transversely aligned axle bolts 37 carried by said plates.

The forward portion of each wheel plate 35 is formed to provide a vertical locking edge 38 and a rectangular pivot ear 39 is welded or otherwise secured to the surface of each wheel plate to overlap and extend forwardly beyond the vertical locking edge 38 thereof.

The load supporting base or platform, designated generally by the reference numeral 40, comprises a pair of rear pivot members 41, a pair of side arms 42 of channel form, and a front pivot housing 43 rested on a caster 44 and attached to the base plate 45 thereof in the usual manner as shown.

The housing 43 extends transversely of the truck and has the form of an elongated rectangular open sided box providing upper and lower walls 46 and 47 and connecting end walls 48 in rectangular relation. The forward ends of the two side arms 42 extend into the housing 43 and are pivotally connected thereto in transversely spaced relation by vertical pivot bolts 49 and nuts 50, said bolts passing through the upper and lower walls 46 and 47 of the housing, through the upper and lower flanges of the side arms 42 and through cylindrical spacers 51 which maintain said side arms in contact with the upper wall 46 of said housing.

Mounted upon the central portion of the upper wall 46 of the housing is a stop bracket 52 providing an upstanding stop 53 and having in its horizontal leg an elongated slot 54 through which passes a clamp bolt 55 extending through the upper wall 46 of the housing to be engaged by a nut 56. By this means the stop bracket may be adjusted to a position in which the upright stop 53 will prevent a forward shifting of the load while being transported, this being of particular importance when going down an appreciable incline such as is often necessary in loading and unloading of freight cars or ships, with the truck supported on its three wheels for use as a dolly.

With particular reference to Figs. 5, 6 and 7 of the drawings, it will be noted that the rear pivot members 41 are mounted to hinge upon horizontal pivot bolts 57 carried by the ears 39 of the respective wheel plates 35 of the back frame structure, and that each bolt 57 carries a helical compression spring 58 which bears against the inner surface of the associated pivot members 41 and against a nut 59 screwed on the inner end of said bolt, said spring exerting its tension yieldingly to maintain the pivot member in an outward position against the pivot ear 39 of the wheel plate 35. Each pivot member 41 has a vertical locking edge 60 which engages against the previously described locking edge 38 of the companion wheel plate 35 and thus locks the two engaging members against relative hinge movement. The pivot members 41 are formed to provide inwardly extending lateral flanges 61 and 62 vertically spaced to receive between them the aft ends of the respective side arms 42 of the load supporting base structure. Each side arm 42 is hingedly connected to its associated pivot member 41 by a vertically disposed pivot bolt 63 that passes through the lateral flanges of both members and has on its lower end a nut 64.

Connecting the opposite pivot members 41 is a lock release chain 65 having its opposite ends extending through clearance apertures in the base side arms 42 and connected to the respective pivot bolts 63. The chain thus connects the two opposed pivot members 41 of the base structure and extends transversely to span the space between said members in position to be engaged and forcibly bowed for the purpose of exerting a pulling force on the opposite pivot members 41 to disengage the lock edges 60 thereof from the companion locking edges 38 of the wheel plates 35, as shown in Fig. 7, to condition the truck for folding. The operator may tension the chain 65 by hand or by forcing the medial portion of the chain downwardly with his foot, as convenience suggests.

It will be noted that when the truck is supported on its three wheels the load supporting base or platform 10 is slightly tilted rearwardly and downwardly and that the back frame structure, when extended for use, is substantially right angularly related thereto. By reason of this slight tilt the load carried by the truck will, by travel vibration, tend to gravitate rearwardly and thus be maintained in close contact with the upright back frame structure.

Although the preferred embodiment, as illustrated in the drawings, includes a relatively narrow front housing 43 which confines the load supporting base or platform 40 to a substantially triangular shape, it will be understood that we may provide a wider housing such as will permit a wider relative spacing of the two front pivot bolts 49 so as to change the shape of said base, in fact said housing may be wide enough to allow said pivot bolts to be so positioned therein as to bring the two side arms 42 into parallelism and thus provide a substantially rectangular base structure. In such event it should be obvious that if greater transverse stability of the truck is necessary or desirable we could provide a caster at each front corner of such rectangular base instead of the single caster employed in the illustrated triangular base.

Operation

The operation and utility of the present invention are believed to be clearly apparent and are briefly summarized at this point.

In the ordinary use of our hand truck, for example in the wholesale bakery trade wherein the bread boxes are of uniform size and depth, the trucks are preadjusted to a width best suitable for this purpose. Such adjustment involves loosening the lower and upper clamp bolts 15 and 20 of the back frame structure, spreading or contracting said back frame to a width somewhat less than the length of the boxes to be handled, and then tightening said clamp bolts, after which the stop bracket 52 is suitably adjusted in proportion to the width of said boxes or baskets, it being assumed that they will be loaded on the truck with their length crosswise of said truck.

The boxes are loaded directly on the load supporting base or platform 40 in stacked relation and are engaged against the back frame structure. Thus loaded, the truck is trundled to its destination without necessitating a balancing thereof by the operator.

In propelling our hand truck over unobstructed surfaces no fore and aft tilting thereof is necessary or desirable. However in some instance, it may be necessary to propel the truck over surface obstructions of such height that the truck wheels are not able freely to ride thereover. In such instances, the truck may be slightly tilted backwards to elevate the front castor wheel over the obstruction and then during a continued propelling of the truck, the operator assists the aft wheels thereof over said obstruction by lifting the aft end of the truck, one side wheel at a time, or together, depending on the manner in which the obstruction is encountered. If the obstruction is more difficult to traverse, the truck is preferably backed thereover permitting more effective lifting and controlling action.

When it is desired to fold the empty hand truck, the operator pulls the latch pins 25 outwardly to disengage their inner latch ends from the latch openings 30 of the lower frame section 10 and folds the released upper frame section 11 forwardly and downwardly upon said lower section 10. The operator then steps, or otherwise thrusts downwardly, on the medial portion of the lock release chain to draw the opposite rear pivot members 41 inwardly against the tension of the springs 58 to disengage the lock edges 60 thereof from the companion lock edges 38 of the associated wheel plates 35 of the back frame structure. With the associated structures thus unlocked, the folded back frame, pivoting on the hinge bolts 57, is folded forwardly and downwardly upon the base structure 40 in the manner illustrated in Fig. 4 of the drawings.

To again condition the hand truck for use, the back frame structure is pulled upwardly and rearwardly to pivot on the hinge bolts 57. When the lower frame section 10 reaches its normal upright position, the locking edges 38 and 60 align and the springs 58 forcefully propel the rear pivot members 41 outwardly to effect a locking coengagement of these locking edges securely to lock the truck base 40 and back frame section 10 in extended position. The upper frame section 11 is thereafter unfolded and when it reaches a position of normal longitudinal alignment with the lower frame section 10, the latch pins 25 automatically snap inwardly into the now aligned openings 29 and 30 in the upper and lower side rails 17 and 12 to maintain the two frame sections in alignment.

From the above description it should be apparent that our improved truck is, by itself, capable of indefinitely supporting its load, that it is adjustable to handle articles of various sizes, that it may be readily folded into a compact condition for storage in a relatively small space, that it can easily and quickly be unfolded and automatically locked in its unfolded condition of use, and that, in its loaded condition, it can be moved to its destination without manual balancing, thus minimizing the hard labor demanded in the handling of hand trucks of the ordinary form.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described our invention what we claim as new and desire to secure by Letters Patent is:

1. A hand truck comprising a substantially horizontal load supporting base, a transverse back frame having a lower portion transversely hinged on substantially horizontal pivot pins to the aft portions of said base, co-engaging lock means associated with the back frame and the base for interlocking the back frame in upright position relative to the base, tension means yieldably urging the aft portions of the base against the lower portion of the frame to maintain coengagement of said lock means whereby said back frame is releasably secured in a normal upright position substantially right angularly related to said base, control means connected to the tension means manually operable to release said tension means to disengage said lock means and permit the back frame to be pivoted on said pivot pins forwardly and downwardly upon the base, and ground wheels supporting the truck.

2. A hand truck comprising a rectangular substantially upright back frame having longitudinal side rails connected by upper and lower pairs of transverse spacer bars with the bars of each pair slidably engaging each other to accommodate variance in the effective width of said back frame, clamp means associated with each pair of spacer bars and operable to secure said bars in adjusted position, wheel plates secured to the lower ends of said side rails, directional ground wheels horizontally journaled on the respective wheel plates in transverse axial alignment, a load supporting base normally disposed perpendicularly to said back frame and including a transversely disposed front pivot housing, a caster supporting said pivot housing, opposite aft pivot members carried by said wheel plates, and a pair of opposed side arms, the opposite ends of said side arms being vertically pivoted at transversely aligned points in the front housing and in the respective aft pivot members to permit the transverse width varying adjustment of the backframe structure.

3. A hand truck comprising a substantially upright back frame having depending wheel plates secured to opposite sides of its lower end, directional ground wheels horizontally journaled on the respective wheel plates in transverse axial alignment, transversely aligned horizontal pivot bolts projecting inwardly from the respective wheel plates, a load supporting base normally disposed perpendicular to said back frame and including rear pivot members associated with the respective wheel plates and rotatable and slidable on the pivot bolts thereof, a front pivot housing supported on a caster, side arms vertically pivoted at their opposite ends to said front housing and said rear pivot members, the adjacent rear pivot members and wheel plates being provided with opposed locking edges, tension means carried by the horizontal pivot bolts and normally urging the rear pivot members outwardly against the wheel plates to engage the opposed locking edges thereof and thus lock the back frame and the base in extended condition, and means functioning in opposition to said tension means and manually operable to pull the opposite rear pivot members inwardly to disengage said locking edges and permit the back frame to be folded upon the base.

4. A hand truck comprising a substantially upright back frame having depending wheel plates secured to opposite sides of its lower end, directional ground wheels horizontally journaled on the respective wheel plates in transverse axial alignment, transversely aligned horizontal pivot bolts projecting inwardly from the respective wheel plates, a load supporting base normally disposed perpendicular to said back frame and including rear pivot members associated with the respective wheel plates and rotatable and slidable on the pivot bolts thereof, a front pivot housing supported on a caster, side arms vertically pivoted at their opposite ends to said front housing and said rear pivot members, the adjacent rear pivot members and wheel plates being provided with opposed locking edges, tension means carried by the horizontal pivot bolts and normally urging the rear pivot members outwardly against the wheel plates to engage the opposed locking edges thereof and thus lock the back frame and the base in extended condition, a transverse lock release chain connected at its ends to the opposite rear pivot members and spanning the intervening space in position to be manually operable to pull the opposite rear pivot members inwardly to disengage said locking edges and permit the back frame to be folded upon the base.

5. A hand truck comprising a substantially horizontal load supporting base providing a pair of side arms movable transversely relative to each other, a transverse back frame having a lower portion pivoted to the side arms of the base, locking means connected between the lower portion of the frame and the side arms of the base for interlocking the arms to the frame thereby maintaining the frame in substantially upright position relative to the base, means yieldably urging the locking means into locked position, control means connected to the side arms of the base operable to move the arms toward each other to release the locking means and to permit pivotal movement of the frame relative to the base, and ground wheels supporting the truck.

6. A hand truck comprising a substantially horizontal load supporting base providing side arms having pivotally interconnected forward ends and rearwardly extended ends, a back frame having side rails and transversely adjustable spacer bars interconnecting the side rails, the side rails having lower ends transversely hinged on substantially horizontal pivot axles to the rearwardly extended ends of the side arms for relative pivotal movement of the frame and the base, co-engaging lock means interlocking the rearwardly extended ends of the side arms, respectively, to the lower ends of the side rails, tension means urging each of said lock means into engagement to secure the back frame in an upright position relative to the base, means connected to the tension means extended between the side arms of the base operable in opposition to the tension means to disengage said lock means and being flexible to permit lateral adjustment of the spacer bars of the back frame and the side arms of the base, and ground wheels supporting the truck.

References Cited in the file of this patent
UNITED STATES PATENTS

| | | |
|---|---|---|
| 639,338 | Barns | Dec. 19, 1899 |
| 2,582,435 | Howard | Jan. 15, 1952 |
| 2,600,611 | Bevington | June 17, 1952 |